United States Patent
Gao et al.

(10) Patent No.: US 11,069,353 B1
(45) Date of Patent: Jul. 20, 2021

(54) MULTILINGUAL WAKEWORD DETECTION

(71) Applicant: Amazon Technologies, Inc., Seattle, WA (US)

(72) Inventors: Yixin Gao, Cambridge, MA (US); Ming Sun, Winchester, MA (US); Jason Krone, Pacific Grove, CA (US); Shiv Naga Prasad Vitaladevuni, Belmont, MA (US); Yuzong Liu, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 56 days.

(21) Appl. No.: 16/404,536

(22) Filed: May 6, 2019

(51) Int. Cl.
| G10L 25/00 | (2013.01) |
| G10L 15/00 | (2013.01) |
| G10L 15/04 | (2013.01) |
| G10L 15/22 | (2006.01) |
| G10L 15/08 | (2006.01) |
| G10L 25/78 | (2013.01) |
| G10L 15/14 | (2006.01) |
| G10L 15/16 | (2006.01) |

(52) U.S. Cl.
CPC ............ *G10L 15/22* (2013.01); *G10L 15/005* (2013.01); *G10L 15/08* (2013.01); *G10L 15/142* (2013.01); *G10L 15/16* (2013.01); *G10L 25/78* (2013.01); *G10L 2015/088* (2013.01)

(58) Field of Classification Search
CPC ....... G10L 15/005; G10L 15/08; G10L 15/16; G10L 15/142; G10L 15/22; G10L 25/78; G10L 2015/088
USPC .......................................... 704/200, 231, 251
See application file for complete search history.

(56) References Cited

U.S. PATENT DOCUMENTS

| 9,600,231 | B1 * | 3/2017 | Sun .................. G10L 15/063 |
| 9,697,828 | B1 * | 7/2017 | Prasad ................ G10L 15/08 |
| 10,074,371 | B1 * | 9/2018 | Wang .................. G10L 15/30 |
| 10,121,494 | B1 * | 11/2018 | Sundaram ............... G10L 25/30 |
| 10,192,546 | B1 * | 1/2019 | Piersol ................ G10L 15/08 |
| 10,580,405 | B1 * | 3/2020 | Wang .................. G10L 17/22 |
| 10,593,328 | B1 * | 3/2020 | Wang .................. H04L 67/125 |
| 10,649,727 | B1 * | 5/2020 | Douglas ............... G10L 15/22 |
| 2014/0163978 | A1 * | 6/2014 | Basye .................. G10L 15/28 704/233 |
| 2015/0154953 | A1 * | 6/2015 | Bapat ................. G10L 15/06 704/251 |
| 2016/0293168 | A1 * | 10/2016 | Chen .................. G10L 15/22 |
| 2018/0012593 | A1 * | 1/2018 | Prasad ................ G10L 15/08 |
| 2018/0061402 | A1 * | 3/2018 | Devaraj ............... H04L 67/306 |
| 2018/0061403 | A1 * | 3/2018 | Devaraj ............... G06F 3/167 |
| 2018/0061404 | A1 * | 3/2018 | Devaraj ............... G10L 15/22 |
| 2018/0108343 | A1 * | 4/2018 | Stevans ............... G10L 13/00 |

(Continued)

*Primary Examiner* — Khai N. Nguyen
(74) *Attorney, Agent, or Firm* — Pierce Atwood LLP

(57) ABSTRACT

A system and method performs multilingual wakeword detection by determining a language corresponding to the wakeword. A first wakeword-detection component, which may execute using a digital-signal processor, determines that audio data includes a representation of the wakeword and determines a language corresponding to the wakeword. A second, more accurate wakeword-detection component may then process the audio data using the language to confirm that it includes the representation of the wakeword. The audio data may then be sent to a remote system for further processing.

20 Claims, 14 Drawing Sheets

(56) References Cited

U.S. PATENT DOCUMENTS

| | | | |
|---|---|---|---|
| 2018/0293974 A1* | 10/2018 | Georges | G10L 15/183 |
| 2018/0357998 A1* | 12/2018 | Georges | G10L 15/14 |
| 2019/0147850 A1* | 5/2019 | Almudafar-Depeyrot | G10L 15/18 |
| | | | 704/257 |
| 2019/0279613 A1* | 9/2019 | Wheeler | G10L 15/005 |
| 2019/0279630 A1* | 9/2019 | Keren | G06F 3/165 |
| 2019/0287526 A1* | 9/2019 | Ren | G10L 15/08 |
| 2019/0295541 A1* | 9/2019 | Pelton | G10L 15/26 |
| 2020/0184966 A1* | 6/2020 | Yavagal | G10L 15/30 |
| 2020/0184967 A1* | 6/2020 | Gupta | G06F 3/167 |
| 2020/0247275 A1* | 8/2020 | Yetukuri | B60N 2/0244 |

* cited by examiner

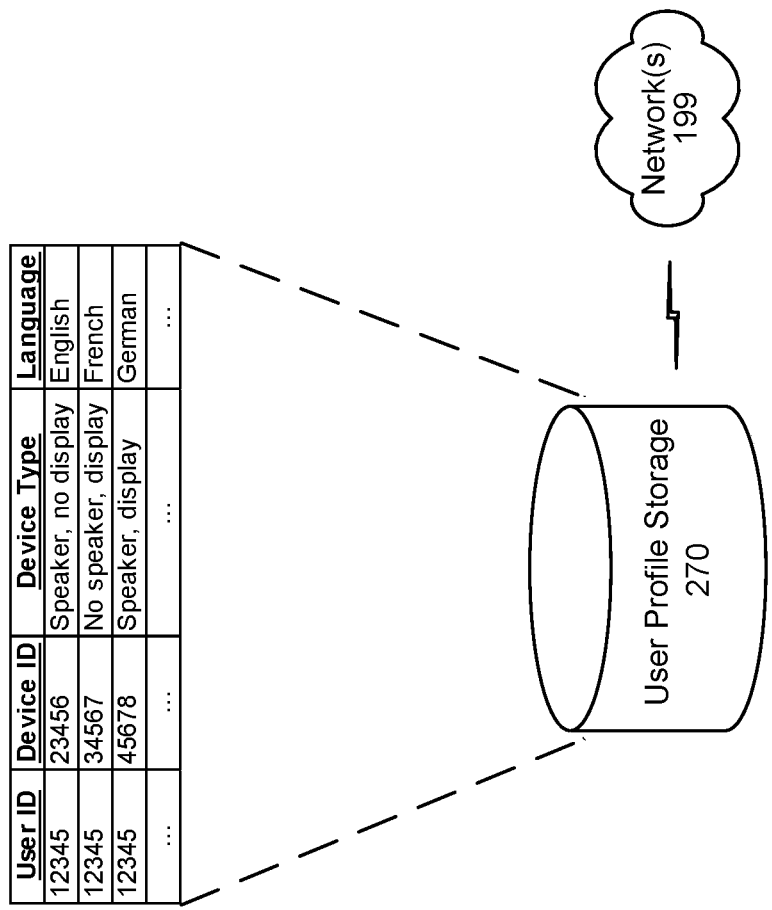

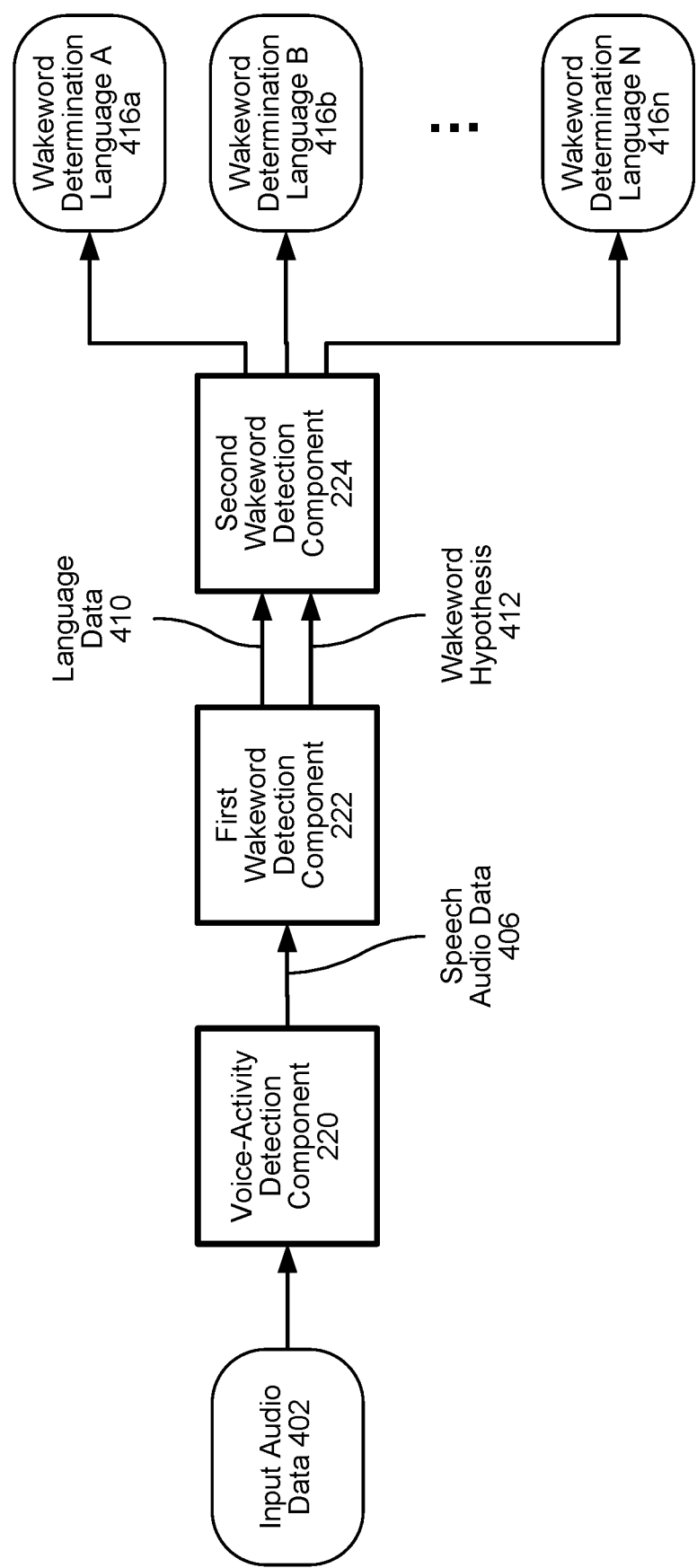

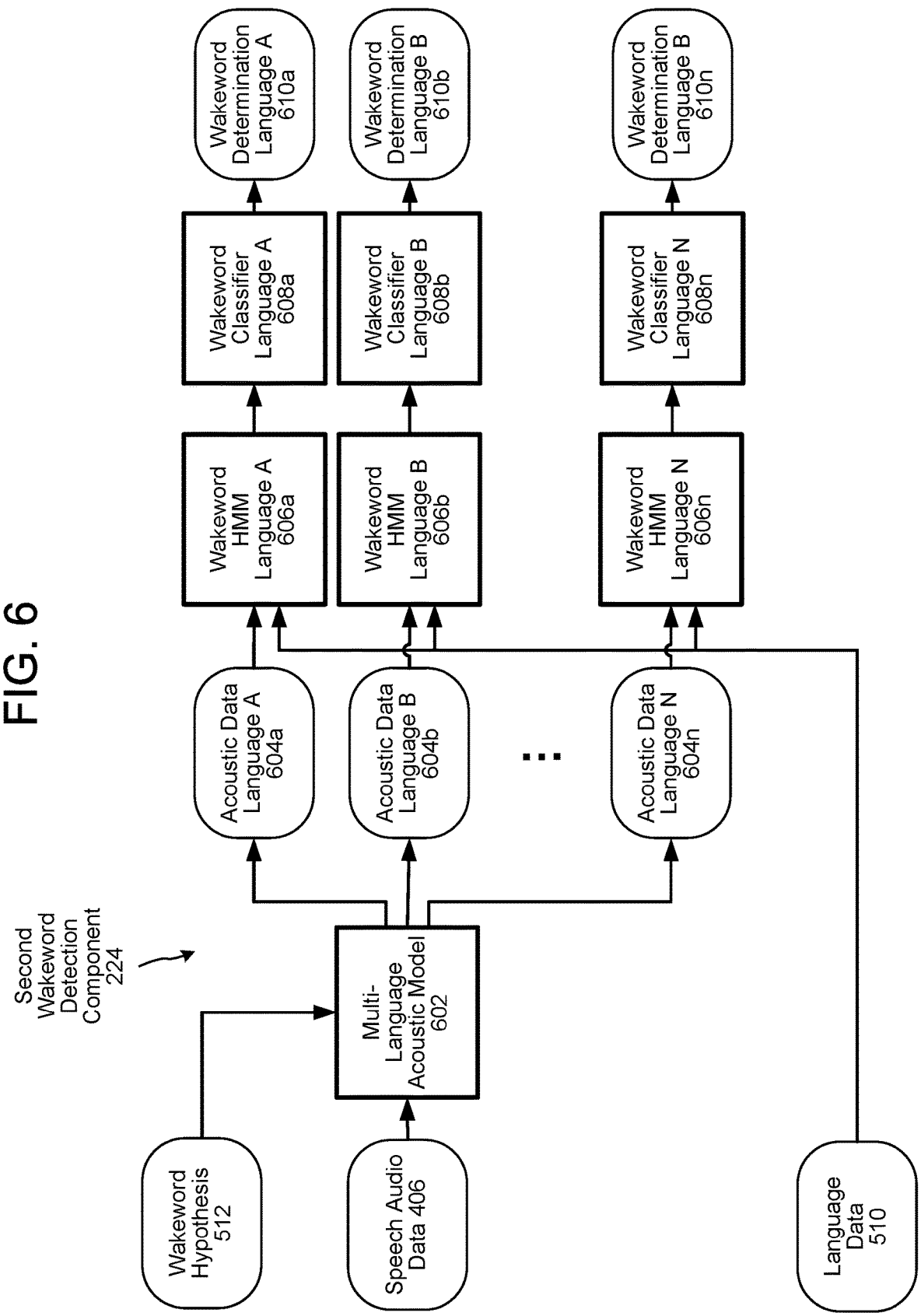

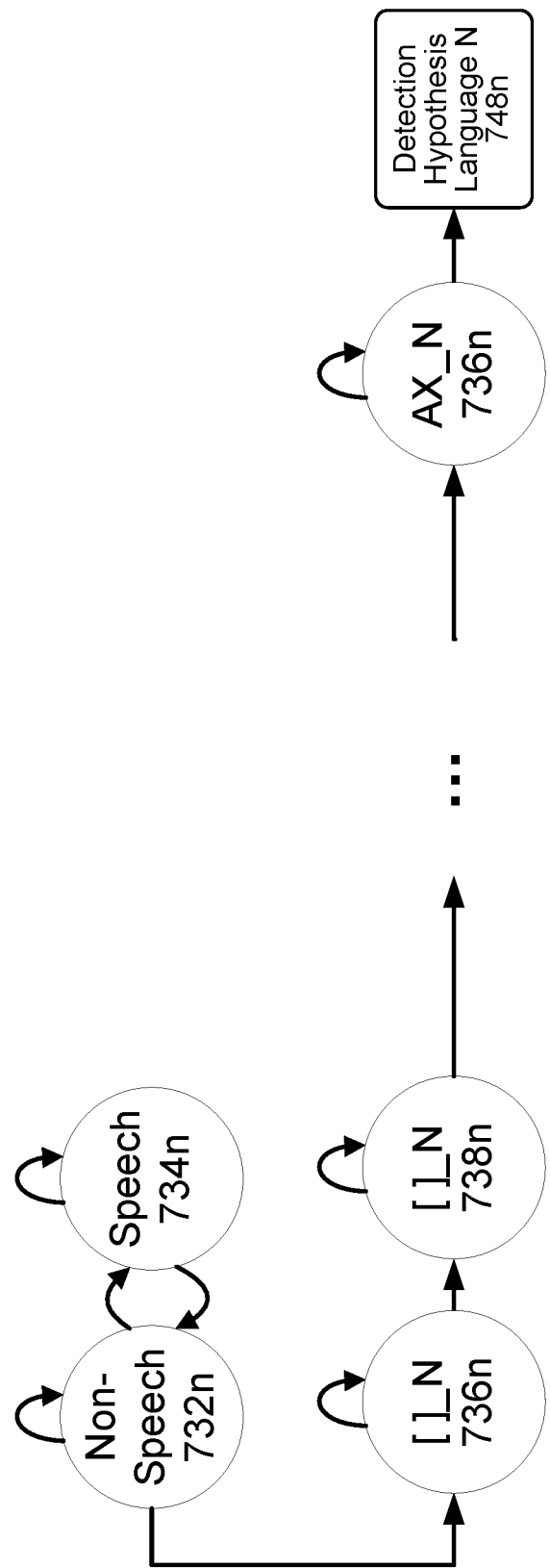

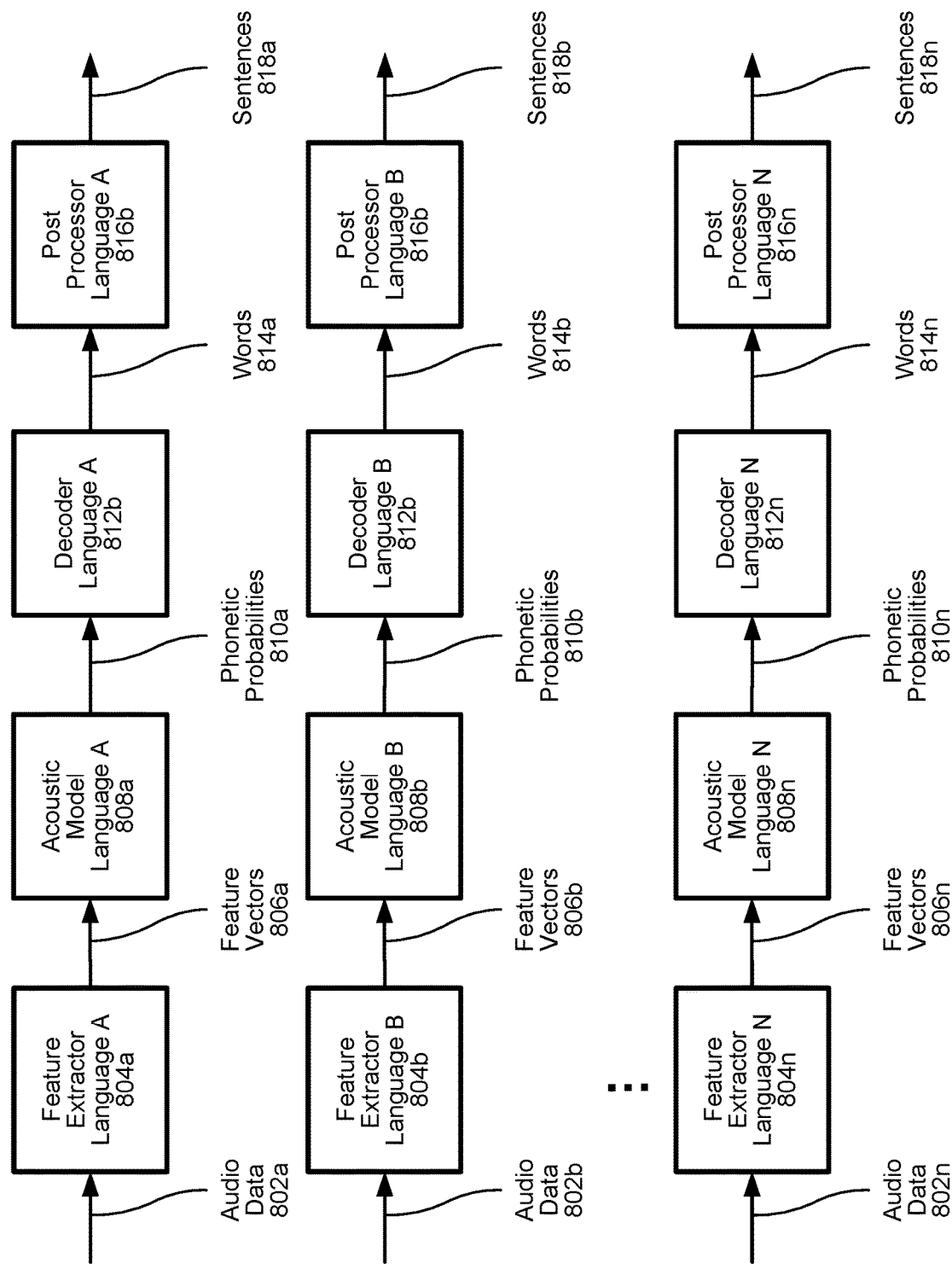

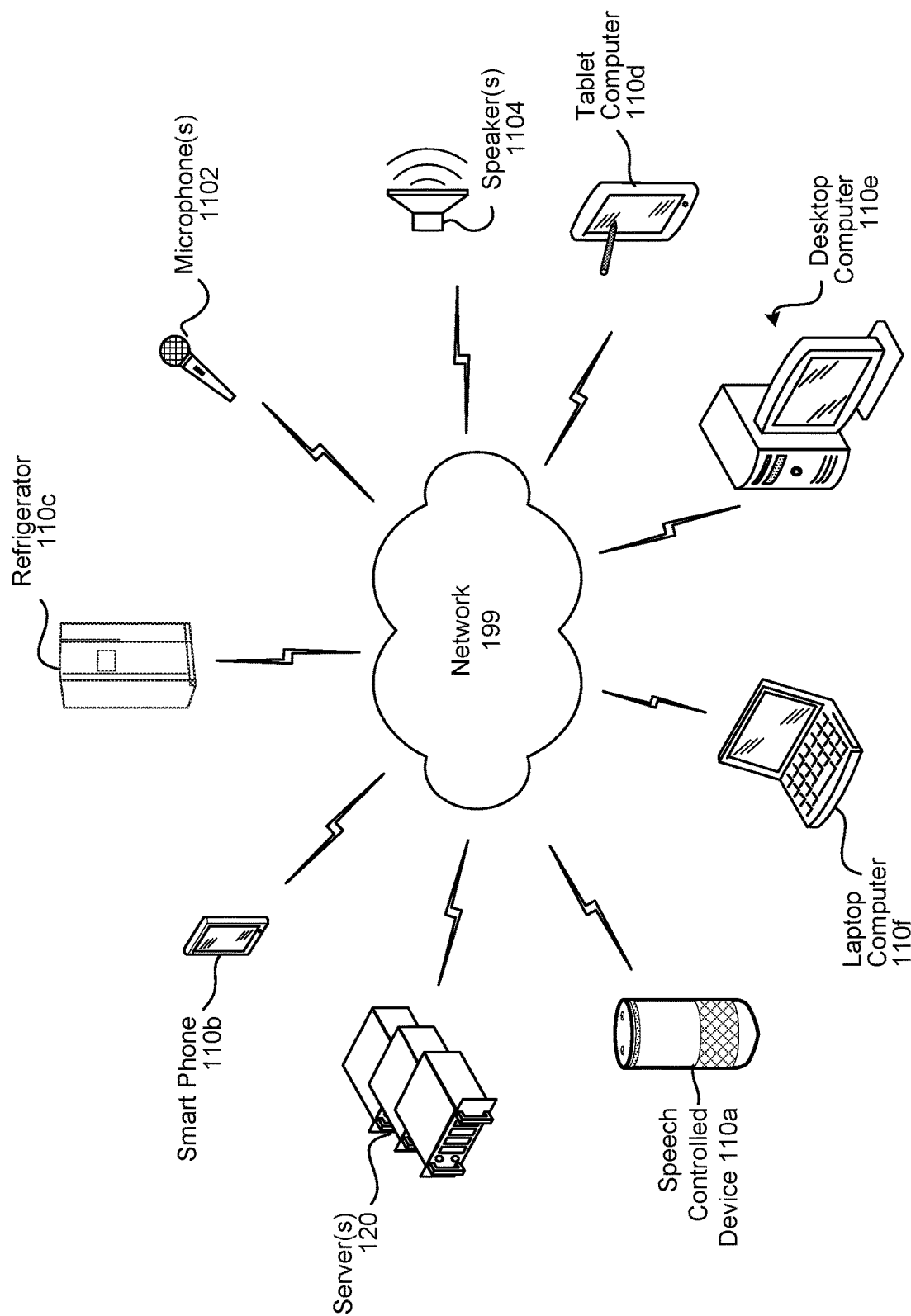

US 11,069,353 B1

MULTILINGUAL WAKEWORD DETECTION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications. Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 3 illustrates data stored and associated with user profiles in accordance with embodiments of the present disclosure.

FIG. 4 illustrates a wakeword-detection system according to embodiments of the present disclosure.

FIG. 6 illustrates a second wakeword-detection component in accordance with embodiments of the present disclosure.

FIGS. 7A-7C illustrate hidden Markov models for detecting a wakeword in accordance with embodiments of the present disclosure.

FIG. 8 illustrates a speech-recognition system in accordance with embodiments of the present disclosure.

FIG. 11 illustrates a computer network for use with embodiments of the present disclosure.

DETAILED DESCRIPTION

Figure 1:
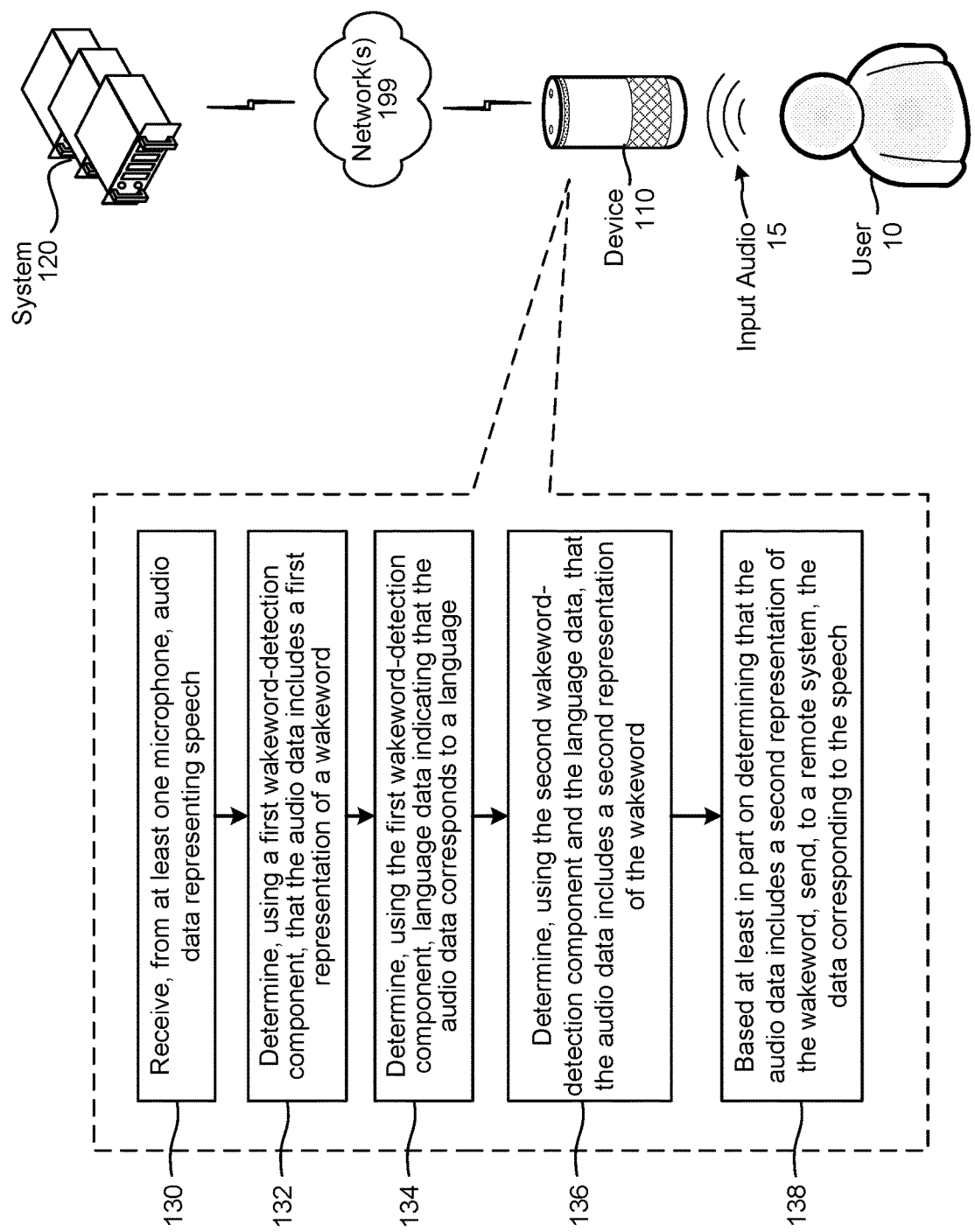
FIG. 1 illustrates a system for detecting a wakeword in accordance with embodiments of the present disclosure.

Automatic speech recognition (ASR) is a field of computer science, artificial intelligence, and linguistics involving transforming audio data associated with speech into text representative of that speech. Natural language understanding (NLU) is a field of computer science, artificial intelligence, and linguistics concerned with enabling computers to derive meaning from text input containing natural language. ASR and NLU are often used together as part of a speech processing system.

Performing ASR and NLU to recognize and understand a full set of words and sentences may be computationally expensive. Significant computing resources may be needed to process ASR and NLU within a reasonable time frame. Because of this need, a distributed computing environment may be used when performing speech processing. An example distributed environment may involve a local device having one or more microphones configured to capture sounds from a user speaking and convert those sounds into an audio signal. The audio signal/data may then be sent to a downstream remote device for further processing, to complete the transformation of the audio signal into an ultimate command. The command may then be executed by a combination of remote and local devices depending on the command itself.

A local device and/or components of the device may be configured to activate upon a user speaking a particular command—i.e., a "wakeword"—to wake the local device so a more powerful system or system component, such as backend system component, can be used to understand any more complex command(s) the user speaks. As such, the wakeword may be used to indicate to the system that it is to perform further processing on subsequent audio. The local device may continually listen for the wakeword and may disregard any audio detected that does not include the wakeword. Typically, systems are configured to detect a wakeword, and then process any subsequent audio following the wakeword (plus perhaps a fixed amount of pre-wakeword audio) to detect any commands in the subsequent audio. As an example, a wakeword may include a name by which a user refers to a device. Thus, if the wakeword is "Alexa," a user may command a local voice-controlled device to play music by saying "Alexa, play some music." The device, recognizing the wakeword "Alexa," "OK Google," and/or "Hey Siri" would understand the subsequent audio (in this example, "play some music") to represent a command of some sort and would send audio data corresponding to that subsequent audio (as well as potentially to the wakeword and some buffered audio prior to the wakeword) to a remote device (or maintain it locally) to perform speech processing on that audio to determine what the command is for execution. Provided services/commands may include performing actions, rendering media, obtaining and/or providing information, providing information via synthesized speech via a local device, initiating Internet-based services on behalf of the user, and so forth.

The local device may include its own ASR system for detecting a subset of words corresponding to a subset of commands. Because, as described above, performing ASR may be computationally expensive, the local ASR system detects only the subset of words. For example, the full ASR system operating on the remote device may be capable of detecting 10,000 different sounds corresponding to words or parts of words, sometimes referred to herein as "acoustic units"; the local ASR system, in contrast, may be capable of detecting only 3,000-4,000 acoustic units. The acoustic units may be, in some embodiments, phones, phonemes, diphones, triphones, or senones. A phone may refer to any acoustic unit; a phoneme may refer to an acoustic unit that, if swapped with another phoneme, would change the meaning of a corresponding word. A diphone may refer to an adjacent pair of phonemes, and a triphone may refer to three adjacent phonemes. A senone may refer to an acoustic realization of a phone or phoneme. The local ASR system may be capable of determining that acoustic units correspond to commands that do not require sophisticated processing, such as raising or lowering a volume level of device with "Alexa, volume up" and "Alexa, volume down."

It may be desirable to have a multilingual wakeword-detection system be capable of detecting wakewords spoken in different languages. A wakeword may be pronounced with a different accent, emphasis, or pronunciation in a first language, such as English, than in a second language, such as French, but the system may be able to recognize the wakeword in only one language. Furthermore, if the device is disposed in an environment in which two or more languages are spoken, such as a multilingual home, place of business, or workplace, embodiments discussed herein will enable the device to be capable of detecting wakewords for all languages regardless of a level of customization.

The present disclosure improves voice-controlled devices by determining not only whether the wakeword is present in captured audio, but also the language that the wakeword was spoken in. A first wakeword-detection component may include a first trained model that is trained using training data corresponding to the wakeword being spoken in multiple languages. This first wakeword-detection component may be relatively small and use only a relatively small amount of power; it may be implemented using, for example, a digital signal processing (DSP) component. Once this first wakeword-detection component detects the wakeword and the language, it causes activation of a relatively larger, relatively more accurate second wakeword-detection component. This second wakeword-detection component may include an acoustic model that creates acoustic unit data, such as phoneme data, corresponding to a plurality of languages. Using the language determination of the first wakeword-detection component, the second wakeword-detection component selects one or more language-specific hidden Markov models (HMMs) and one or more corresponding language-specific classifiers. The selected classifiers then determine if the wakeword corresponding to that language is present in the captured audio. If so, the device may send the corresponding audio data to a remote system for further processing, such as speech processing. The device may further send the language determination to the remote device, which may use it to select a speech processing component specific to that language.

FIG. 1 illustrates how a device 110 may use first and second wakeword-detection models to detect a wakeword that may be spoken in one of a plurality of languages. Although the figures and discussion illustrate certain operational steps of the system in a particular order, the steps described may be performed in a different order (as well as certain steps removed or added) without departing from the intent of the disclosure. The device 110 is local to a user 10, and it may communication with a remote system 120 using across the network 199. The device 110 may receive input audio 15 from the user 10 and may perform wakeword detection using the input audio 15. If a wakeword is detected, the device 110 may further send audio data representing the input audio 15 to the system 120 via the network 199. The system 120 may perform additional speech processing (e.g., ASR and NLU), using a language-specific speech-processing component, on the audio data to determine output data responsive to an utterance represented in the audio data. The device 110 may receive the output data from the system 120 and output content (e.g., audio and/or video) corresponding to the output data.

The device 110 may receive (130) from a microphone or microphone array, audio data that represents speech. The device 110 may determine (132), using a first wakeword-detection component, that the audio data includes a first representation of a wakeword. The first wakeword-detection component may be a low-power component that executes using a digital-signal processor (DSP). The device may determine (134), using the first wakeword-detection component, language data indicating that the audio data corresponds to one or more languages in which the speech is uttered. The device may determine (136), using a second wakeword-detection component and the language data, that the audio data includes a second representation of the wakeword. Based at least in part on determining that the audio data includes a second representation of the wakeword, device may send (138), send, to a remote system, the audio data.

Figure 2:
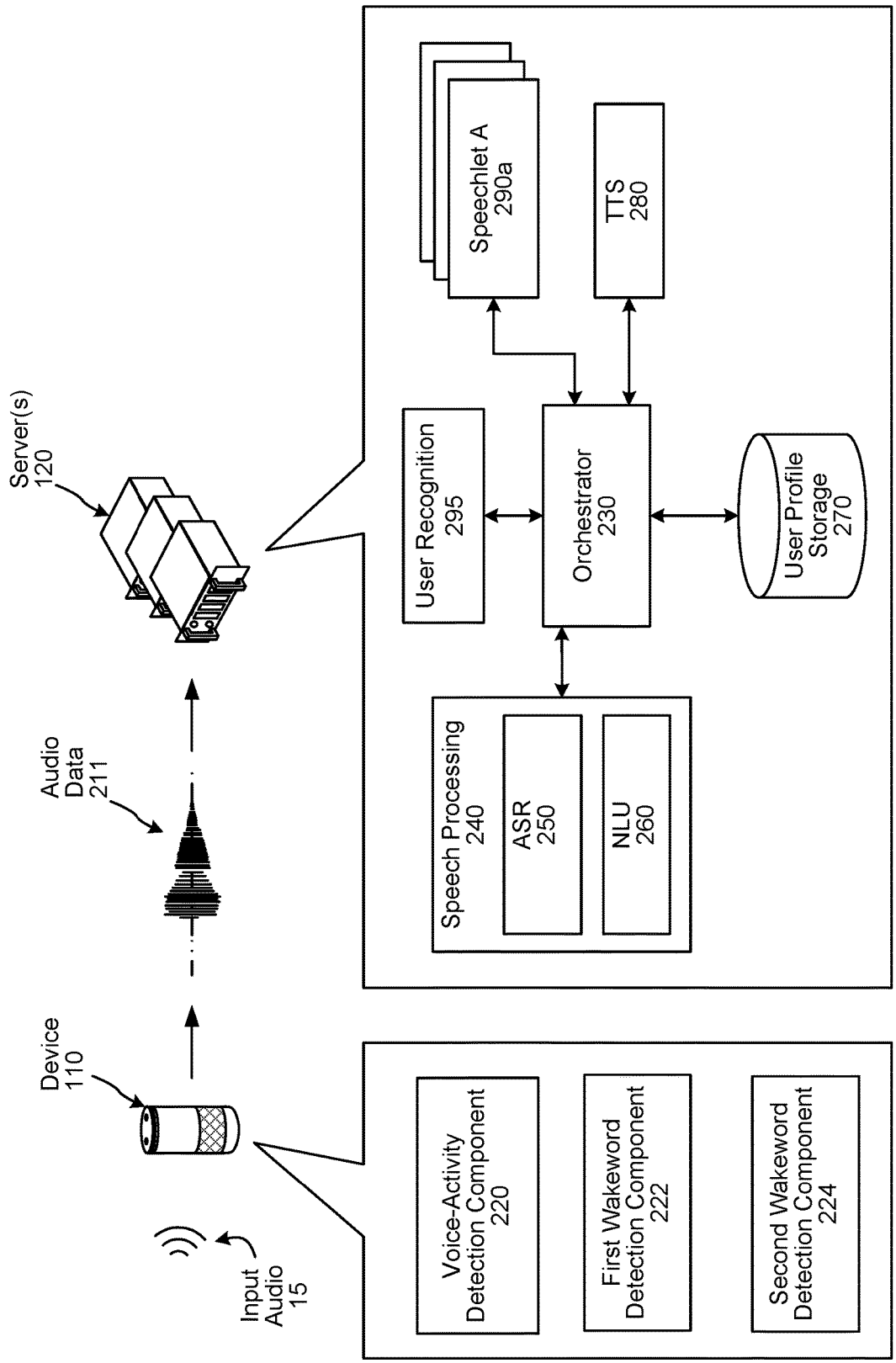
FIG. 2 illustrates components of a system for detecting a wakeword in accordance with embodiments of the present disclosure.

The device and system may operate using various components as described in FIG. 2. The various components may be located on same or different physical devices. Communication between various components may occur directly or across the network 199.

Before performing wakeword detection (e.g., activating one or more wakeword-detection components), the device 110 may use various techniques to first determine whether the received audio data includes speech. For example, the device 110 may use a voice activity detection (VAD) component to apply VAD techniques. Such VAD techniques may determine whether speech is present in the first audio data based on various quantitative aspects of the first audio data, such as the spectral slope between one or more frames of the first audio data, the energy levels of the first audio data in one or more spectral bands the signal-to-noise ratios of the first audio data in one or more spectral bands; or other quantitative aspects. In other examples, the VAD component 220 may be a trained classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the first audio data to one or more acoustic models in speech storage, which acoustic models may include models corresponding to speech, noise (e.g., environmental noise or background noise), or silence. Still other techniques may be used to determine whether speech is present in the first audio data. In various embodiments, the VAD component 220 consumes less power than the first wakeword-detection component, which begins processing audio data (and hence consuming power) only when the VAD component determines that the audio data likely represents speech. In other embodiments, the first wakeword-detection component processes all received audio data, and the VAD component 220 is not present or not used.

If the VAD component 220 determines the audio data includes speech, a first wakeword-detection component 222 may activate to process the audio data to determine if a wakeword is likely represented therein. If the first wakeword-detection component 222 determines that the audio data likely represents a wakeword, a second, more accurate wakeword-detection component 224 may activate and further process the audio data to determine whether it includes the wakeword. Following detection of the wakeword, the device 110 sends audio data 211, corresponding to at least an utterance following the wakeword in the audio data, to the system 120.

The first and/or second wakeword-detection components 222, 224 may process the audio data using trained models to detect a wakeword. The trained models may be acoustic models, hidden Markov models (HMMs), and/or classifiers. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each wakeword and non-wakeword speech signals. The non-wakeword speech includes other spoken words, background noise, etc. There can be one or more HMMs built to model the non-wakeword speech characteristics. Viterbi decoding may be used to search the best path in the decoding graph, and the decoding output is further processed to make the decision on wakeword presence. This approach can be extended to include discriminative information by incorporating a hybrid DNN-HMM decoding framework. In another example, the first and/or second wakeword detection components 222, 224 may be built on deep neural network (DNN)/recursive neural network (RNN) structures directly, without MINI involved. These first and/or second wakeword detection components 222, 224 may estimate the posteriors of wakewords with context information, either by stacking frames within a context window for a DNN, or using a RNN. Follow-on posterior threshold tuning or smoothing is applied for decision making. Other techniques for wakeword detection may also be used.

After wakeword detection and upon receipt by the system 120, the audio data 211 may be sent to an orchestrator component 230. The orchestrator component 230 may include memory and logic that enables the orchestrator component 230 to transmit various pieces and forms of data to various components of the system.

The orchestrator component 230 sends the audio data 211 to a speech processing component 240. The speech processing component 240 may include different components for different languages. One or more components may be selected based on determination of one or more languages. A selected ASR component 250 of the speech processing component 240 transcribes the audio data 211 into text data representing one more hypotheses representing speech contained in the audio data 211. The ASR component 250 interprets the utterance in the audio data 211 based on a similarity between the utterance and pre-established language models. For example, the ASR component 250 may compare the audio data 211 with models for sounds (e.g., subword units, such as phonemes, etc.) and sequences of sounds to identify words that match the sequence of sounds spoken in the utterance represented in the audio data 211. The ASR component 250 sends (either directly or via the orchestrator component 230) the text data generated thereby to a corresponding selected NLU component 260 of the speech processing component 240. The text data output by the ASR component 250 may include a top scoring hypothesis or may include an N-best list including multiple hypotheses. An N-best list may additionally include a score associated with each hypothesis represented therein. Each score may indicate a confidence of ASR processing performed to generate the hypothesis with which it is associated.

The NLU component 260 attempts, based on the selected language, to make a semantic interpretation of the phrases or statements represented in the text data input thereto. That is, the NLU component 260 determines one or more meanings associated with the phrases or statements represented in the text data based on individual words represented in the text data. The NLU component 260 determines an intent (e.g., a system action that a user desires the system to perform) representative of text data as well as pertinent pieces of information in the text data that allow a device (e.g., the device 110, the system 120, etc.) to execute the intent. For example, if the text data corresponds to "play Africa by Toto," the NLU component 1060 may determine a user intended the system to output the song Africa performed by the band Toto, which the NLU component 260 determines is represented by a <PlayMusic> intent.

The orchestrator component 230 (or another component of the system 120) may send NLU results data to a speechlet component 290 associated with the intent. The speechlet component 290 determines output data based on the NLU results data. For example, if the NLU results data includes intent data corresponding to <PlayMusic> and tagged text corresponding to <Artist: Toto>, the orchestrator 230 (or other component of the system 120) may send the NLU results data to a music speechlet component, which determines Toto music audio data for output by the system.

A "speechlet" may be software running on the system 120 that is akin to an application. That is, a speechlet may enable the system 120 to execute specific functionality in order to provide data or produce some other output requested by the user 10. The system 120 may be configured with more than one speechlet. For example, a weather speechlet may enable the system 120 to provide weather information, a ride-sharing speechlet may enable the system 120 to book a trip with respect to a taxi or ride sharing service, and a food-order speechlet may enable the system 120 to order a pizza with respect to a restaurant's online ordering system.

In some instances, a speechlet 290 may provide output text data responsive to received NLU results data. The system 120 may include a text-to-speech (TTS) component 280 that generates output audio data from speechlet provided output text data. The TTS component 280 may use different synthesis techniques. In one method of synthesis, called unit selection, the TTS component 280 analyzes text data against a database of recorded speech. The TTS component 280 selects units of recorded speech matching the text data and concatenates the units together to form output audio data. In another method of synthesis called parametric synthesis, the TTS component 280 varies parameters such as frequency, volume, and noise to create output audio data including an artificial speech waveform. Parametric synthesis uses a computerized voice generator, sometimes called a vocoder. In another method of speech synthesis, a trained model called a sequence-to-sequence model directly generates output audio data based on the input text data.

The system 120 may include a user-recognition component 295. The user-recognition component 295 may receive the audio data 211 and/or text data output by the ASR component 250. The user-recognition component 295 may determine scores indicating whether the speech represented in the audio data 211 originated from a particular user. For example, a first score may indicate a likelihood that the speech originated from a first user and a second score may indicate a likelihood that the speech originated from a second user. The user-recognition component 295 may also determine an overall confidence regarding the accuracy of user recognition operations. The user-recognition component 295 may perform user recognition by comparing audio characteristics in the audio data 211 to stored audio characteristics of users. The user-recognition component 295 may also perform user recognition by comparing biometric data (e.g., fingerprint data, iris data, etc.) received by the system in correlation with the audio 15 to stored biometric data of users. The user-recognition component 295 may further perform user recognition by comparing image data (e.g., including a representation of at least a feature of a user) received by the system in correlation with the audio 15 with stored image data (e.g., including representations of features of users). The user-recognition component 295 may perform additional user recognition processes. Output of the user-recognition component 295 may be used to inform NLU processing as well as processing performed by speechlets 290.

The system 120 may include a user-profile storage 270. The user profile storage 270 may include a variety of information related to individual users and/or groups of users that interact with the system 120. The user-profile storage 270 may include one or more user profiles. Each user profile may be associated with a different user ID. A user profile may be an umbrella profile specific to one or a group of users. That is, a user profile may encompass two or more individual user profiles, each associated with a respective user ID. For example, a user profile may be a household profile that encompasses user profiles associated with multiple users of a single household. A user profile may include preferences shared by all the user profiles encompassed thereby. Each user profile encompassed under a single user profile may include preferences specific to the user associated therewith. That is, each user profile may include preferences unique from one or more other user profiles encompassed by the same user profile. A user profile may be a stand-alone profile or may be encompassed under another user profile. As illustrated, the user profile storage 270 is implemented as part of the system 120. The user profile storage 270 may, however, may be disposed in a different system in communication with the system 120, for example over the network 199. User-profile data may be used to inform NLU processing as well as processing performed by a speechlet 290.

As described above, the first and/or second wakeword-detection component 222, 224 may implement device specific and/or user specific machine learned models. One or more machine learned models may, however, be trained using both device specific speech-processing data and user specific speech processing data. The more data types used to train a machine learning model, the more accurate a resulting trained model may be in predicting whether the wakeword detection sensitivity should be lowered. For example, other data that may be used to train a machine learning model includes a type of the device 110 or a location of the device 110 (e.g., a geographic location or a location with a building).

Users may speak a first wakeword followed by a first command to a device and thereafter speak a second wakeword followed by a second command to the device. Moreover, an intent of the first command may indicate to the system that the device is likely to receive the second wakeword and second command. For example, a user may routinely say "Alexa, play [artist name]," with "Alexa" corresponding to a first wakeword and "play [artist name]" corresponding to a <PlayMusic> intent. After a user speaks such, it may that the user says "Alexa, [increase or decrease] the volume," with "Alexa" corresponding to a second wakeword and "play [increase or decrease] the volume" corresponding to a <ChangeVolume> intent. Because the user routinely speaks the command corresponding to the <ChangeVolume> intent after the user speaks the command corresponding to the <PlayMusic> intent, the system 120 may infer that the wakeword detection sensitivity should be lowered when the system determines a command corresponding to a <PlayMusic> intent.

In some implementations, the system 120 may receive input audio data from the device 110 as well as receive indications from the device 110 that the device 110 detected a wakeword and that the wakeword corresponds to a language. The system 120 may perform processes to confirm that the wakeword is present in the input audio data using a model trained using data accessible to the system 120. This may be beneficial if the device 110 performs unreliable wakeword detection or, at least less-reliable wakeword detection than the system 120.

The aforementioned models and other models described herein may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data and may be used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component may include establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. During training, the training data may be applied to a model and the output of the model may be evaluated for its accuracy in producing the expected output specified by the training data. The model may be updated in accordance with, for example, a gradient-descent algorithm, in which one or more weights of the model are back filled.

FIG. 3 illustrates the user profile storage 270 that includes data regarding individual user profiles 302. Each user profile 302 may include information indicating various devices, output capabilities of each of the various devices, and a location of each of the various devices. In some embodiments, the user profile 302 indicates a preferred language for a particular user profile; the device 110 and/or system 120 may use this language information when determining a language corresponding to a wakeword and/or command. For example, if there is a tie between two languages (e.g., the device 110 determines that two languages correspond to an utterance with equal probabilities), and if the language in the user profile matches one of the two languages, the matching language may be selected over the non-matching language. Each user profile 302 may additionally include other data not explicitly illustrated.

The device-profile data represents a profile specific to a device. For example, device profile data may represent various user profiles that are associated with the device, speech processing that was performed with respect to audio data received from the device, instances when the device detected a wakeword, etc. In contrast, user profile data represents a profile specific to a user. For example, user profile data may represent various devices associated with the user, etc.

Figure 5A:
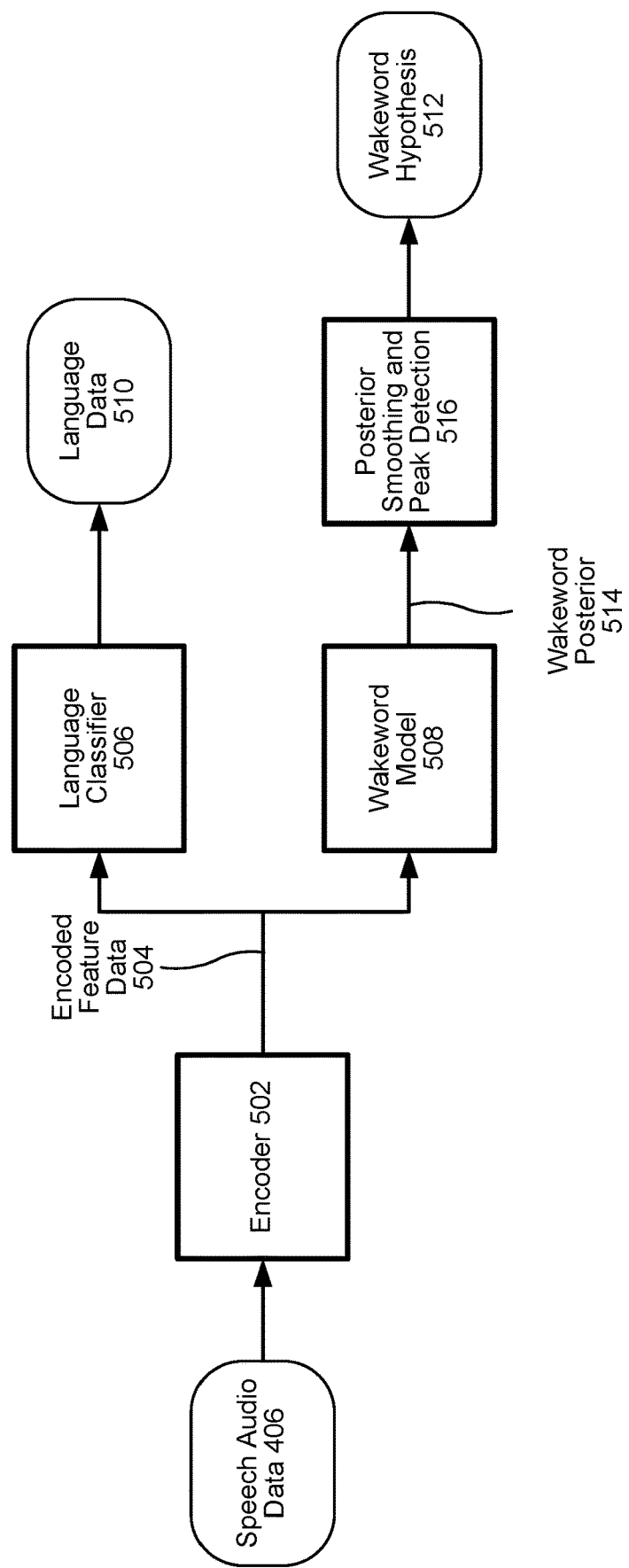
FIGS. 5A and 5B illustrate a first wakeword-detection component in accordance with embodiments of the present disclosure.
Figure 5B:
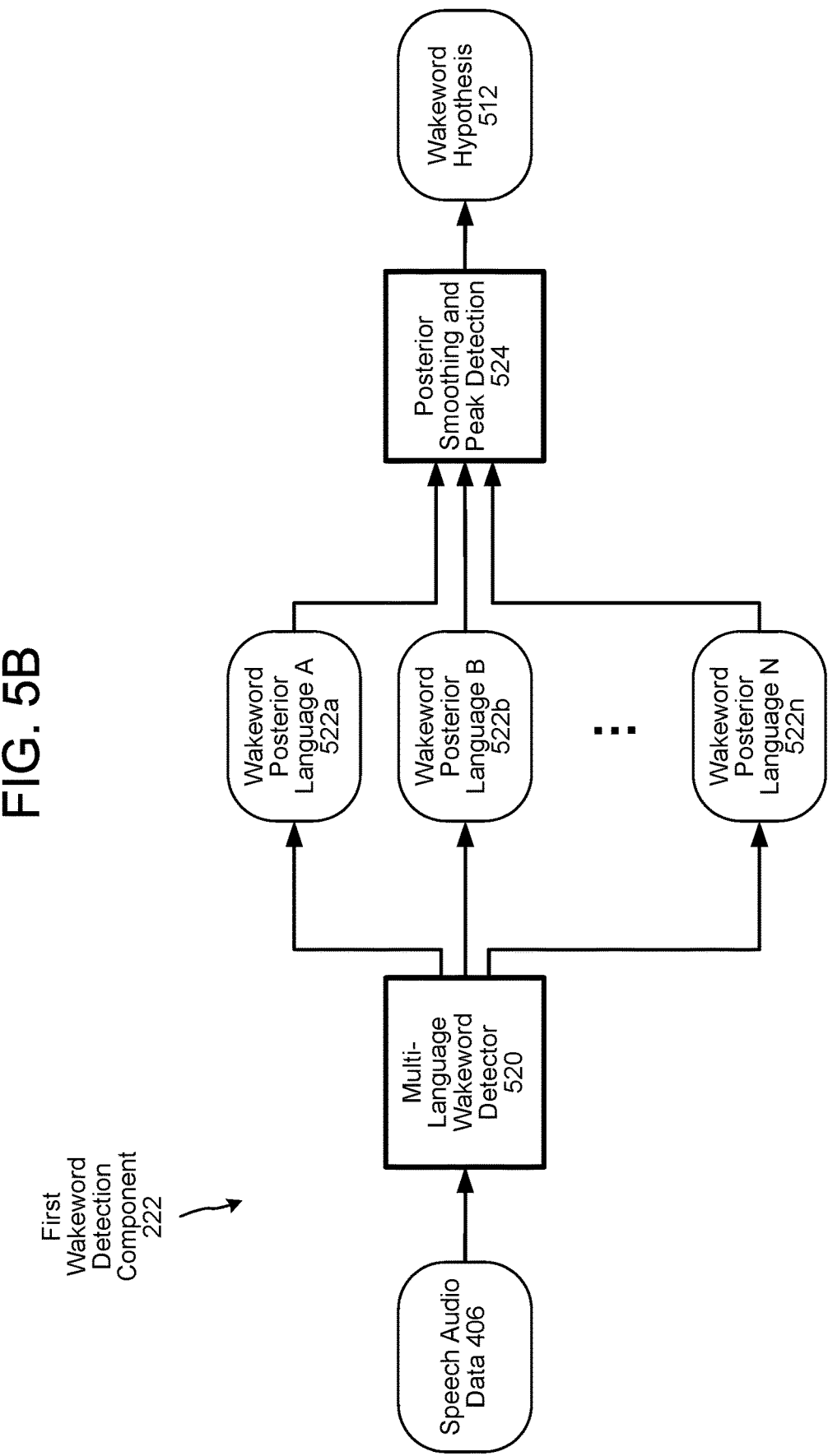

FIG. 4 illustrates components of the device 110 in accordance with the present disclosure, of which further disclosure is provided in FIGS. 5A-5B and 6. In various embodiments, the device 110 receives input audio data 402 that potentially represents an utterance by the user 10 and which may also represent a wakeword. The input audio data 402 may be digital data that represents a time-domain or frequency domain audio signal. In other embodiments, the input audio data 402 is data that has been processed using, for example, an acoustic model, and represents acoustic units and/or audio features of the digital data. This acoustic feature data may be vectors of floating-point numbers that each represent a value of a feature.

The VAD component 220 may receive and process the input audio data 402 using the techniques described above. In accordance with those techniques, the VAD component 220 may determine that the input audio data 402 likely includes a representation of speech. If this determination is made, the VAD component 220 may send corresponding speech-related audio data, referred to herein as speech audio data 406, to the first wakeword-detection component 222. The speech audio data 406 may be digital data that represents a time-domain or frequency domain audio signal. As noted above, however, in some embodiments, the device 110 does not include and/or does not use the VAD component 220; in these embodiments, the first wakeword-detection component 222 processes the input audio data 402 continually and not only when the VAD component 220 determines that the input audio data 402 likely includes a representation of speech.

As discussed in greater detail herein, the first wakeword-detection component 222 determines a first likelihood that the speech audio data 406 includes a representation of the wakeword and a second likelihood of which language the speech corresponds to. The first wakeword-detection component 222 may thus generate a wakeword hypothesis 412 that represents this first likelihood. The wakeword hypothesis 412 may be a number representing a confidence that the speech audio data 406 represents the wakeword; for example, the number may be 1.0 if the first wakeword-detection component 222 is 100% confident that the speech audio data 406 includes a representation of the wakeword, may be 0.0 if the first wakeword-detection component is 0% confident that the speech audio data 406 does not include a representation of the wakeword, or may be a value between 0.0 and 1.0 to reflect degrees of partial confidence in the speech audio data 406 representing the wakeword. A value of 0.75, for example, may correspond to 75% confidence in the speech audio data 406 including a representation of the wakeword. The wakeword hypothesis 412 may further include a confidence value over time and may indicate at which times in the speech audio data 406 that the wakeword is more or less likely to be represented.

The first wakeword-detection component 222 may further generate language data 410 that represents the second likelihood that the wakeword was spoken in a given language. As described in greater detail herein, the first wakeword-detection component 222 may include a model trained to determine in which language a given utterance was spoken. The language data 410 may include indication of one language or a ranked list of candidate languages and associated confidence values that the languages correspond to the speech audio data 406. For example, because some languages may include similar sounds or words, such as Spanish and Portuguese, the first wakeword detection component 222 may not be able to determine that the speech audio data 406 corresponds to either Spanish or Portuguese. In these embodiments, the first wakeword-detection component 222 may determine that the language data 410 includes a first likelihood that the speech audio data 406 corresponds to Spanish and a second likelihood that the speech audio data 406 corresponds to Portuguese. Some other languages, such as Hindi, include a number of words of another language, such as English. In some embodiments, therefore, the first wakeword-detection component 222 may similarly determine that the language data 410 includes a first likelihood that the speech audio data 406 corresponds to Hindi and a second likelihood that the speech audio data 406 corresponds to English.

The first wakeword-detection component 222 may be implemented using a specialized system component, such as a DSP, that consumes relatively less power that the second wakeword-detection component 224, which may use a larger, general-purpose processor. After the first wakeword-detection component 222 determines that the speech-audio data 406 likely represents the wakeword and determines a likely language in which that wakeword was spoken, the first wakeword-detection component 222 may activate the second wakeword-detection component 224, which may then further process the speech audio data 406 to more accurately determine whether the speech audio data 406 includes a representation of the wakeword. The second wakeword-detection component 224 may, until the first wakeword-detection component 222 determines that the speech audio data 406 likely includes a representation of the wakeword, operate in a powered-down or low-power state. That is, the second wakeword-detection component 224 may be idle and may not be processing the speech audio data 406 unless and until the first speech wakeword-detection component 222 first determines that the speech audio data 406 likely includes a representation of the wakeword.

The second wakeword-detection component 224 may, as described in greater detail below, re-analyze the speech audio data 406 using the language data 410 to determine a yes-no determination as to whether the speech audio data 406 includes a representation of the wakeword in a language specified by the language data 410 and thereby determine a wakeword determination 416. The wakeword determination may be a yes-no value, such as a 1 or a 0, that indicates presence or absence of a wakeword, and include a confidence score corresponding to a likelihood of presence of the wakeword. If the determination is positive, the device 110 may send the speech audio data 406 and the language data 410 to another system for further processing, such as the system 120.

FIGS. 5A-5B illustrate various embodiments of the first wakeword-detection component 222. Referring first to FIG. 5B, the first wakeword-detection component 222 may first process the speech audio data 406 using an encoder 502. The encoder 502 may be a convolution neural network (CNN) and/or a recurrent neural network (RNN). The encoder 502 may generate encoded feature data 504 based on the speech audio data 406. The encoded feature data 504 may be a vector of numbers that represent one or more audio features related to the speech audio data 406, such as volume, pitch, frequency, cadence, intonation, and/or changes over time of these features. A vector may be generated for each audio frame or group of audio frames. The encoded feature data 504 may further include audio features related to language-specific aspects of the speech audio data 406, such as language-specific consonant and vowel sounds. The encoder 502 may be trained using training data, which may include audio data representing the wakeword being spoken in a plurality of languages and annotations indicating in which language each wakeword is spoken. The encoded feature data 504 may be a vector of numbers; the dimension of the vector (e.g., the size of the vector) may be, for example, 100-500. The speech audio data 406 may be divided into audio frames, in which each audio frame represents a discrete amount of time of audio, such as 10 milliseconds. A new item of encoded feature data 504 may be generated for each audio frame or for a group of audio frames.

A language classifier 506 may receive the audio feature data and, based thereon, determine language data 510, which may include one or more indications of one or more languages corresponding to the encoded feature data 504. For example, the language data 510 may include a ranked list of languages, wherein a top-ranked language is the most likely language that corresponds to the encoded feature data 504, the second-most ranked language is the second-most likely language, and so on. The language classifier 506 may be a CNN, RNN, and/or long short-term memory (LSTM). The language classifier 506 may determine the language data 510 based on encoded feature data 504 corresponding to the wakeword and/or encoded feature data 504 corresponding to a command associated with the wakeword or other utterance data.

A wakeword model 508 may determine a wakeword hypothesis 512 based on the encoded feature data 504. The wakeword model 508 may be a CNN or RNN. The wakeword hypothesis 512 may be a number representing a confidence that the encoded feature data 504 represents the wakeword; for example, the number may be 1.0 if the wakeword model 508 is 100% confident that the encoded feature data 504 includes a representation of the wakeword, may be 0.0 if the wakeword model 508 is 0% confident that the encoded feature data 504 does not include a representation of the wakeword, or may be a value between 0.0 and 1.0 to reflect degrees of partial confidence in the encoded feature data 504 representing the wakeword. A value of 0.75, for example, may correspond to 75% confidence in the encoded feature data 504 including a representation of the wakeword. The wakeword hypothesis 512 may further include a confidence value over time and may indicate at which times in the encoded feature data 504 that the wakeword is more or less likely to be represented. In some embodiments, the wakeword model 508 outputs a wakeword posterior 514, which is processed using a posterior-smoothing and peak detection component 516 to first remove or reduce spikes and other quickly changing transient effects in the wakeword posterior 514. The posterior smoothing and peak detection component 516 may then detect peaks in the smoothed wakeword posteriors by, for example, comparing the smoothed wakeword posteriors to a threshold. The posterior smoothing and peak detection component 516 may further determine that a wakeword is detected if the smoothed wakeword posteriors are greater than the threshold for a certain amount of time, such as 500 milliseconds. The posterior-smoothing component 516 may be a filter, such as a finite-impulse response (FIR) filter, or a trained model, such as a CNN or RNN.

Referring to FIG. 5B, in some embodiments, the functionality of the encoder 502, the language classifier 506, and the wakeword model 508 may be combined into a multi-language wakeword detector 520. The multi-language wakeword detector 520 may be a CNN, DNN, and/or LSTM. The multi-language wakeword detector 520 may, using the speech audio data 406, determine one or more wakeword-detection hypotheses 522; each wakeword-detection hypothesis 522 may correspond to a likelihood that the speech audio data 406 corresponds to a representation of a wakeword in a particular language. As explained above with reference to FIG. 5A, a posterior-smoothing and peak detection component 524 may be used to reduce or remove transient effects in the wakeword-detection hypotheses 522, such as spikes, and to detect peaks in the smoothed wakeword posteriors.

Referring to FIG. 6, in various embodiments, the second wakeword-detection component 224 receives the speech audio data 406, the wakeword hypothesis 512, and the language data 510 (e.g., the outputs of the first wakeword-detection component 222). As explained above, the second wakeword-detection component 224 may be in a low-power or "sleep" state until the first wakeword-detection component 222 determines that a wakeword is likely present in the speech audio data 406. During this low-power state, the second wakeword-detection component 224 may not process the speech audio data 406. When, however, the first wakeword-detection component 222 determines that a wakeword is likely present in the speech audio data 406, the second wakeword-detection component 224 leaves the low-power state or "wakes" and begins processing the speech audio data 406.

A multi-language acoustic model 602 may receive the speech audio data 406 and, when the wakeword hypothesis 512 indicates that a wakeword is likely present in the speech audio data 406, wakes and process the speech audio data 406 to determine acoustic data 604 for each of a plurality of languages, such as acoustic data 604a for a first language A, acoustic data 604b for a second language B, and so on. The acoustic data 604 may include representations of acoustic units for each language, such as a first set of acoustic units for the first language A, a second set of acoustic units for the second language B, and so on. The multi-language acoustic model 602 may be a CNN, RNN, or other type of model.

A plurality of HMMs 606 customized for each language may receive the acoustic data 604 and may process the acoustic data 604 to determine a likelihood that a wakeword is present in the speech audio data 406. The HMMs 606 may use the language data 510 to select a subset of HMMs corresponding to the language data 510 for further processing. HMMs 606 that do not correspond to the language data 510 may either not process the acoustic data 604 or may process the acoustic data 604 and produce a low score or probability that a version of the wakeword in the relevant language is present in the speech audio data 406. The HMMs 606 are explained in greater detail below with reference to FIGS. 7A-7C.

Language-specific classifiers 608, which may be CNNs and/or RNNs, may process the speech audio data 406 and the outputs of the HMMs 606 to determine final wakeword-determination data 610, which may be a final yes/no determination of whether a wakeword corresponding to a particular language is present in the speech audio data 406. If one or more of the wakeword determination data 610 indicates presence of a wakeword, the device 110 may send the speech audio data 406 to the system 120 for further processing, as discussed below with reference to FIG. 8. The device may, in addition, send the language data 510 to the server 120; the server 120 may use the language data 510 to select a language-specific speech-processing pipeline.

Figure 7A:
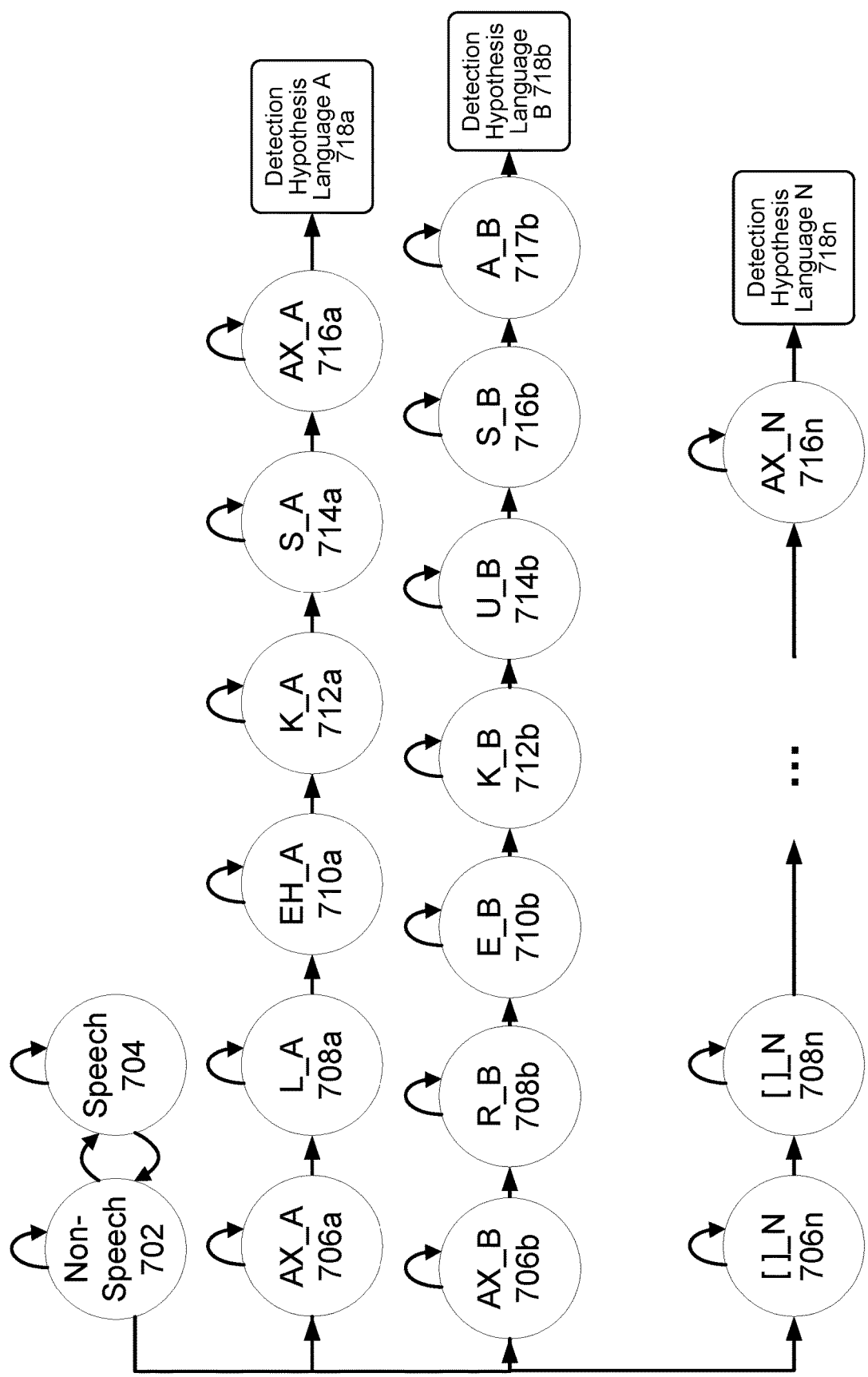
Figure 7B:
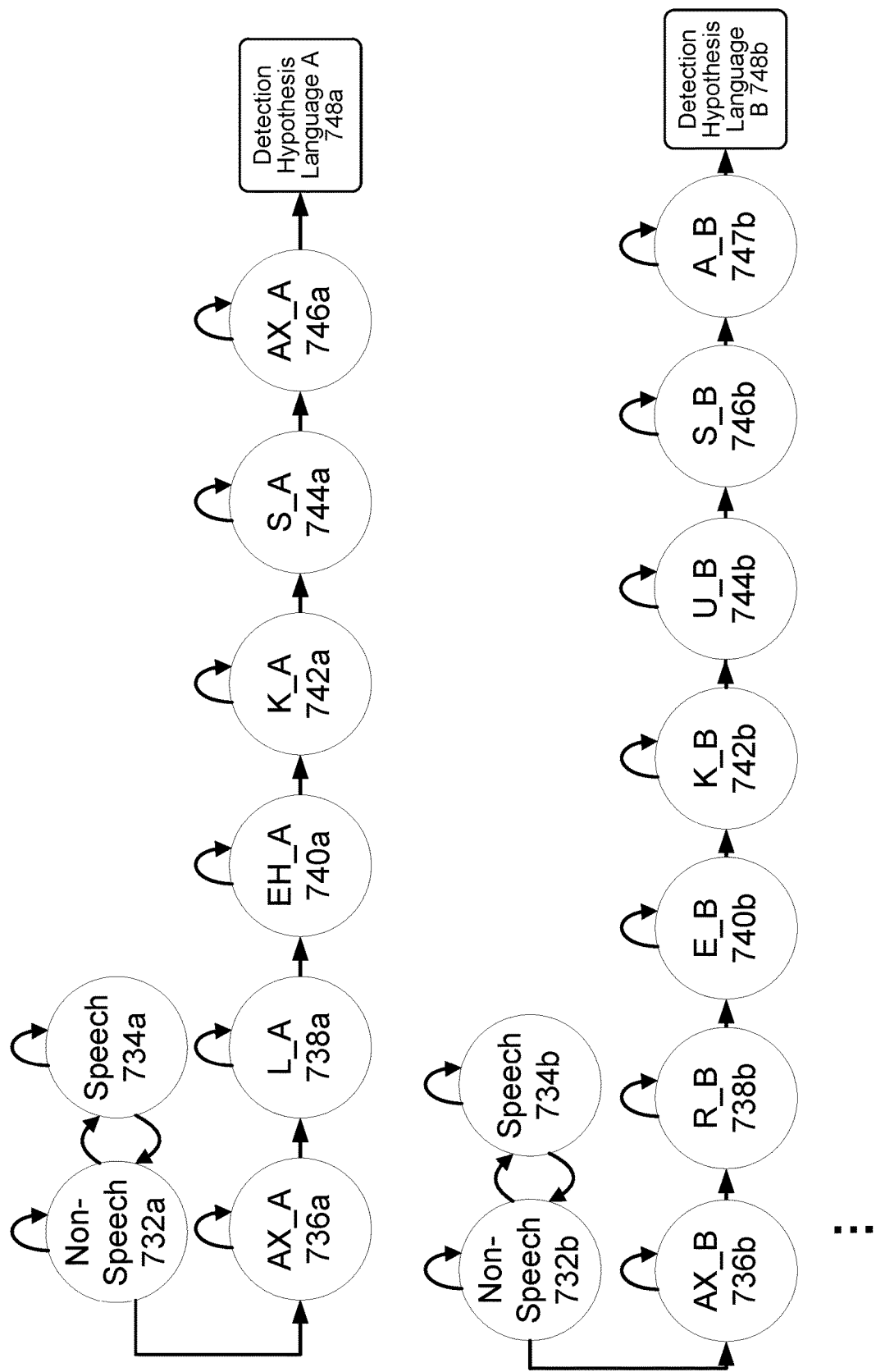

FIGS. 7A-7C illustrate HMMs 606 for detecting wakewords corresponding to different languages in accordance with embodiments of the present disclosure. As explained above, the HMMs 606 may determine which acoustic units, such as senones or phonemes, correspond to a wakeword and which acoustic units correspond to non-speech 702 or non-wakeword speech 704. As illustrated, the HMM may detect a particular wakewords, "Alexa," but the present disclosure is not limited to only that wakeword. In some embodiments, in accordance with FIG. 7A, a single HMM has multiple wakeword paths corresponding to each language to detect the wakewords. The HMMs 606 may move through states corresponding to acoustic units when those acoustic units are detected in audio data to determine a first detection hypothesis 718a corresponding to a first wakeword spoken in a first language, a second detection hypothesis 718b corresponding to a second wakeword spoken in a second language, and so on. Each detection hypothesis 718 may be a number representing a confidence that the speech audio data 406 represents the wakeword; for example, the number may be 1.0 if the second wakeword-detection component 224 is 100% confident that the speech audio data 406 includes a representation of the wakeword, may be 0.0 if the second wakeword-detection component 224 is 0% confident that the speech audio data 406 does not include a representation of the wakeword, or may be a value between 0.0 and 1.0 to reflect degrees of partial confidence in the speech audio data 406 representing the wakeword. A value of 0.75, for example, may correspond to 75% confidence in the speech audio data 406 including a representation of the wakeword. The detection hypothesis 718 may further include a confidence value over time and may indicate at which times in the speech audio data 406 that the wakeword is more or less likely to be represented.

The acoustic units corresponding to the first language—which may be, for example, English—may be "AX_A" 706a, "L_A" 708a, "EH_A" 710a, "K_A" 712a, "S_A" 714a, and "AX_A" 716a. The acoustic units corresponding to the second language—which may be, for example, Japanese—may be "AX_B" 706b, "R_B" 708b, "E_B" 710b, "K_B" 712b, "U_B" 714b, "S_B" 716b, and "A_B" 717b. The number of acoustic units for a language N may be any number. The detection hypothesis for each language may be determined in accordance with the below equation (1).

$$\operatorname{argmax} \log \frac{f_i}{b}; i: \log\left(\frac{f_i}{b}\right) > \theta_i \quad (1)$$

In equation (1), $f_i$ is the probability of the foreground path for a wakeword i, $b_i$ the probability of the common background path, and $\theta_i$ is the corresponding threshold of the log-likelihood ratio.

FIGS. 7B and 7C illustrate HMM systems 606 for detecting multiple wakewords in accordance with embodiments of the present disclosure. In these embodiments, instead of the multi-path HMM described with reference to FIG. 7A, multiple HMMs are used—one HMM for each wakeword. A first HMM may be used to detect a wakeword (for example, "Alexa") in a first language and a second HMM may be used to detect a wakeword in a second language. Each HMM may distinguish between the wakeword, non-speech 732 and non-wakeword speech 734. The first HMM may determine that acoustic units "AX_A" 736a, "L_A" 738a, "EH_A" 740a, "K_A" 742a, "S_A" 744a, and "AX_A" 746a correspond to the wakeword in the first language (which may be English) and determine a corresponding hypothesis 748a. The second HMM may determine that acoustic units "AX_B" 736b, "R_B" 738b, "E_B" 740b, "K_B" 742b, "U_B" 744b, "S_B" 746b, and "A_B" 747b correspond to the wakeword in the second language (which may be Japanese) and determine a corresponding hypothesis 748b. The number of acoustic units for a language N may be any number.

The detection hypothesis may be determined in accordance with the below equation (2).

$$\operatorname{argmax} \log \frac{f_i}{b_i}; i: \log\left(\frac{f_i}{b_i}\right) > \theta_i \quad (2)$$

In equation (2), $f_i$ is the probability of the foreground path for a wakeword i, $b_i$ the probability of the background path for a wakeword i, and $\theta_i$ is the corresponding threshold of the log-likelihood ratio.

FIG. 8 illustrates systems for speech processing using multiple languages. Each system may use a different set of components tailored to a particular language as described herein; for example, a first system for a first language A may have a first feature extractor 804a, a second system for a second language B may have a second feature extractor 804b, and so on.

A system for performing automatic speech recognition for a language may include feature extractors 804 that receive audio data 802 corresponding to an utterance in a particular language and output one or more feature vectors 806 that represent one or more features of the audio data 802. The audio data 802 may be a time-domain, digital representation of corresponding audio, which may include an utterance. The feature extractor 804 may be, for example, a convolutional recurrent neural network (CRNN) or other such model. The feature extractor 804 may be configured to extract, from the input audio data 802, feature data 806 corresponding to features that may be relevant to audio classification and/or other operations performed by other components. The feature extractor 804 may include a convolutional recurrent neural network (CRNN), convolutional neural network (CNN), other neural network, or other trained model acting as a feature extractor. The audio feature data 806 may correspond to a two dimensional feature map where one dimension corresponds to time and another dimension corresponds to feature data. Thus, for each time unit of feature data will include a number of feature data values for that time unit.

Thus the audio feature data 806 may track a certain number of dimensions worth of feature data for each time unit. The resolution of each time unit for the audio feature data 806 may not necessarily be the same as the original input audio data 802. For example, one time unit of the audio feature data 806 may correspond to a longer time duration than an original audio frame (which may be the time unit for audio data 802). Thus, there may not be a one-to-one relationship between a unit of audio data 802 and a unit of audio feature data 806. For example, one time unit of the audio feature data 806 may correspond to eight audio data frames, four audio data frames, or a different time unit that does not correspond to an integer number of audio frames—various such time units are possible using the system. Thus each time unit of audio feature data 806 may include data corresponding to many different original audio data frames. The time resolution may depend on system configuration. The audio feature data 806 may be data in a time domain or frequency domain, may include binned data according to frequency ranges or time ranges, may include different configurations of features, etc. Configuration of the audio feature data 806 may also depend on configuration of the feature extractor 804.

The feature data 806 may correspond to one or more values in feature dimensions that may be used by other models in performing further operations. The feature data 806 may include values that represent features of the audio, such as timber, pitch, volume, or other such values. The feature data 806 may further include values that represent features of the audio that do not correspond directly to these features. In certain instances the feature extractor 804 may be trained using a classifier so that the feature extractor 804 learns the feature data most useful to the later operations.

To produce the audio feature data 806, the feature extractor 804 may be configured as a CRNN. A residual network structure may be used as the convolutional network in the feature extractor CRNN, which may include two convolutional blocks. The feature extractor CRNN may include a number of layers. A bottom convolutional layer may input the audio data 802 and with a stride of (2,1) (meaning the layer may skip an output every two timestamps). The CRNN then may have a max pooling layer with a stride of (2,2) resulting in a 2× time dimensionality reduction and a 2× frequency reduction. The result of the max pooling is then processed by the next two convolutional blocks/residual network blocks (e.g., Cony 3×3, 64), the output of which is then processed by the next two convolutional blocks (Cony 3×3, 128). An average pooling block may then be used to further reduce the dimensionality before feeding into a bi-directional gated recurrent unit (GRU) layer to produce the audio feature data 806. The audio feature data 806 may have a time scale of 186 milliseconds, e.g., eight times the resolution of an input spectrogram. The number of units in the feature data may correspond to the number of units in the bi-directional GRU layer of the CRNN.

An acoustic model 808 may receive the acoustic features 806 and output corresponding phonetic probabilities 810. The phonetic probabilities 810 may represent the different ways a spoken utterance may be interpreted (i.e., different hypotheses) and may assign a probability or a confidence score representing the likelihood that a particular set of words matches those spoken in an utterance. The phonetic probabilities 810 may be based on a number of factors including, for example, the similarity of the sound in the utterance to models for language sounds and the likelihood that a particular word that matches the sounds would be included in the sentence at the specific location (e.g., using a language or grammar model). Thus each potential textual interpretation of the spoken utterance (hypothesis) is associated with a confidence score. The acoustic model 808 may also output multiple hypotheses in the form of a lattice or an N-best list with each hypothesis corresponding to a confidence score or other score (such as probability scores, etc.).

The acoustic model 808 may include rules that may be used to assign specific audio waveform parameters to input acoustic units and/or corresponding prosodic annotations. The rules may be used to calculate a score representing a likelihood that a particular audio output parameter(s) (such as frequency, volume, etc.) corresponds to the portion of the input symbolic linguistic representation.

The acoustic model 808 may include one or more HMMs that may be used to determine the probabilities that audio output should match textual input. HMMs may be used to translate parameters from the linguistic and acoustic space to the parameters to be used by a vocoder (a digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.).

An initial determination of a probability of a potential phoneme may be associated with one state. As new text is processed, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise model) based vocoders, CELP (code-excited linear prediction) vocoders, GlottHMM vocoders, HSM (harmonic/stochastic model) vocoders, or others.

A decoder 812 may receive the phonetic probabilities 810 and output corresponding words 814. The decoder 812 may be a model, as described above, trained to translate the phonetic probabilities 810 into the words 814 in accordance with training data. A post processor 816 may similarly be a trained model, as described above, to form sentences 818 from the words 814.

Figure 9:
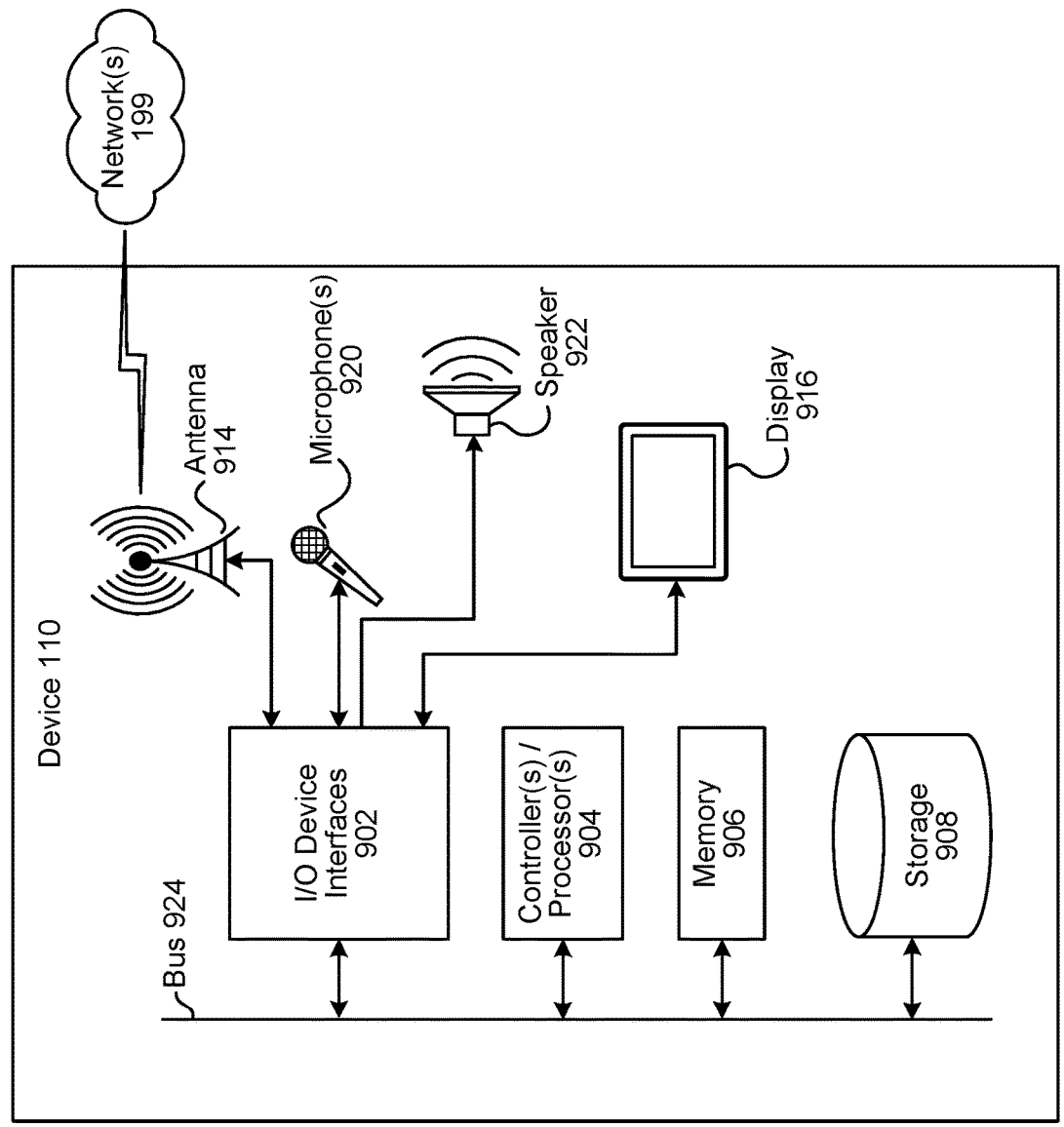
FIG. 9 illustrates components of a device in accordance with embodiments of the present disclosure.
Figure 10:
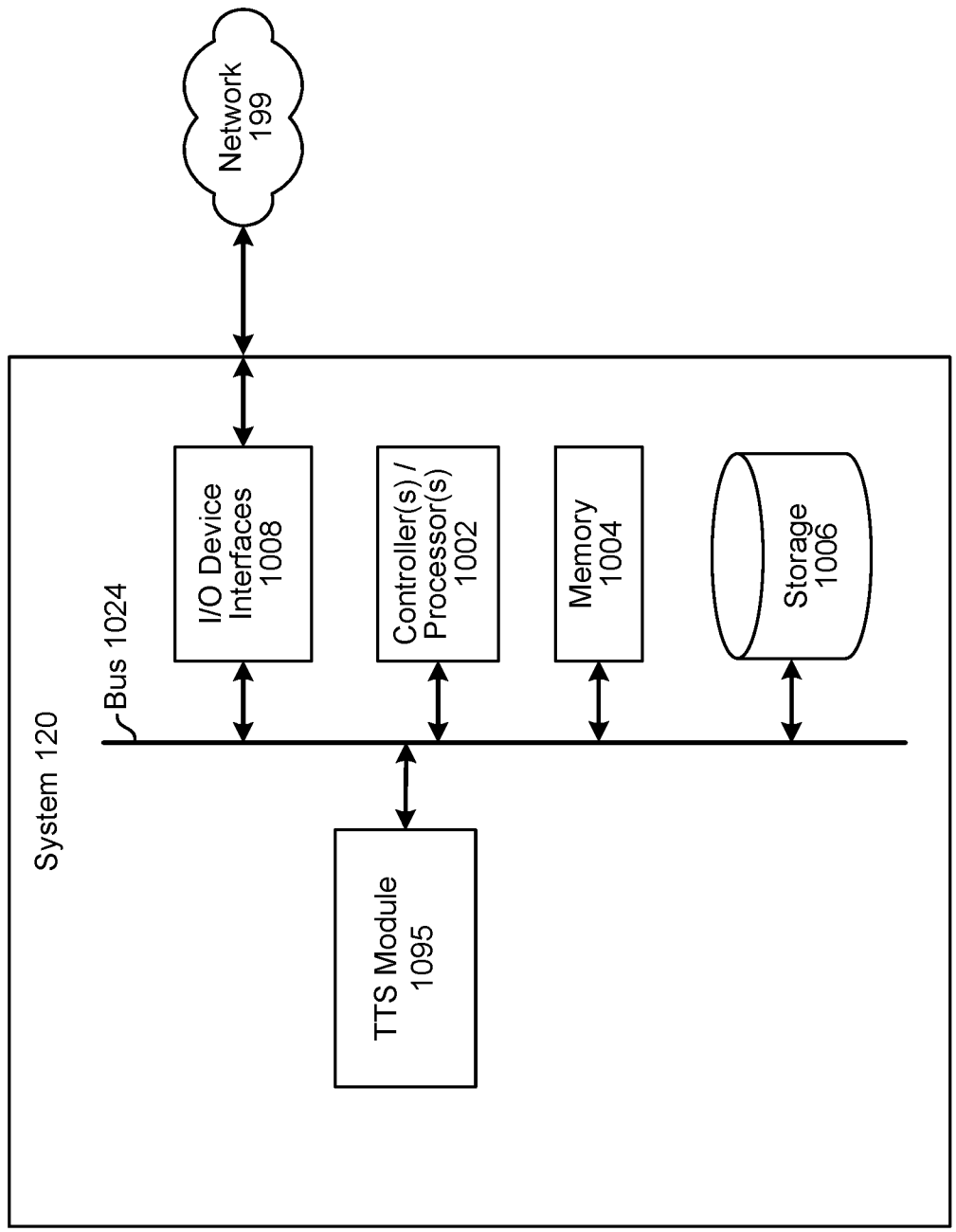
FIG. 10 illustrates components of a server in accordance with in accordance with embodiments of the present disclosure.

FIG. 9 is a block diagram conceptually illustrating the device 110. FIG. 10 is a block diagram conceptually illustrating example components of a remote device, such as the system 120, which may assist with ASR processing, NLU processing, etc. Multiple servers may be included in the system 120, such as one or more servers for performing ASR, one or more servers for performing NLU, etc. In operation, each of these devices (or groups of devices) may include computer-readable and computer-executable instructions that reside on the respective device (110/120), as will be discussed further below.

The device 110 and/or the system 120 may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. The device 110 and/or the system 120 may also include a data storage component (908/1008) for storing data and controller/processor-executable instructions. Each data storage component (908/1008) may individually include one or more non-volatile storage types such as magnetic storage, optical storage, solid-state storage, etc. The device 110 and/or the system 120 may also be connected to removable or external non-volatile memory and/or storage (such as a removable memory card, memory key drive, networked storage, etc.) through respective input/output device interfaces (902/1002).

Computer instructions for operating the device 110 and/or the system 120 and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

The device 110 and/or the system 120 may include input/output device interfaces (902/1002). A variety of components may be connected through the input/output device interfaces (902/1002), as will be discussed further below. Additionally, each device (110/120) may include an address/data bus (924/1024) for conveying data among components of the respective device. Each component within a device (110/120) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 922, a wired headset or a wireless headset, or other component capable of outputting audio. The device 110 may also include an audio capture component. The audio capture component may be, for example, a microphone 920 or array of microphones, a wired headset or a wireless headset, etc. The device 110 may additionally include a display 916 for visually presenting content.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network 199, the system may be distributed across a networked environment. The I/O device interface (902/1002) may also include communication components that allow data to be exchanged between devices such as different physical servers in a collection of servers or other components.

The components of the device 110 and the system 120 may include their own dedicated processors, memory, and/or storage. Alternatively, one or more of the components of the device 110 and the system 120 may utilize the I/O interfaces (902/1002), processor(s) (904/1004), memory (906/1006), and/or storage (908/1008) of the device 110 and system 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the system 120, as described herein, are illustrative, and may be located as a stand-alone device or may be included, in whole or in part, as a component of a larger device or system.

As illustrated in FIG. 11, multiple devices (110a-110g, 120, 1102, 1104) may contain components of the present disclosure and the devices may be connected over a network 199. The network 199 may include a local or private network or may include a wide-area network, such as the Internet. Devices may be connected to the network 199 through either wired or wireless connections. For example, a speech-controlled device 110a, a smart phone 110b, a refrigerator 110c, a tablet computer 110d, a desktop computer 110e, and/or laptop computer 110f may be connected to the network 199 through a wireless service provider, over a WiFi or cellular network connection, or the like. A microphone 1102 and a speaker 1104 may further be connected to the network 199. Other devices are included as network-connected support devices, such as the system 120, or others. The support devices may connect to the network 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from at least one microphone, audio data;
   determining, using a voice-activity detection (VAD) component, that the audio data includes a representation of speech;
   determining, using a first wakeword-detection component executing on a digital-signal processor (DSP), that the audio data includes a first representation of a wakeword;
   determining, using the first wakeword-detection component, language data indicating a first likelihood that the speech corresponds to a first spoken language;
   after determining that the audio data includes the first representation of a wakeword, activating a second wakeword-detection component executing on a computer processor different from the DSP, at least a portion of the second wakeword-detection component corresponding to the first spoken language;
   determining, using the second wakeword-detection component and the language data, that the audio data includes a second representation of the wakeword; and
   sending, to a remote system, data representing the speech.

2. The computer-implemented method of claim 1, wherein determining that the audio data includes the first representation of the wakeword comprises:
   determining, using a shared recurrent neural network (RNN) and convolution neural network (CNN) encoder of the first wakeword-detection component, audio feature data corresponding to the audio data;
   processing, using a wakeword classifier of the first wakeword-detection component, the audio feature data to determine a wakeword hypothesis; and
   processing, using a language classifier of the first wakeword-detection component, the audio feature data to determine the language data.

3. The computer-implemented method of claim 1, wherein determining the language data further comprises:
   processing, using an acoustic model, the audio data to determine audio feature data;
   processing, using an encoder, the audio feature data to determine encoded feature data; and
   processing, using a language classifier, an encoded feature value to find a first value corresponding to the first likelihood.

4. The computer-implemented method of claim 1, wherein determining that the audio data includes the second representation of the wakeword comprises:
   determining, using an acoustic model of the second wakeword-detection component and the audio data, acoustic data corresponding to phonemes representing the first spoken language;
   processing the acoustic data using a hidden Markov model corresponding to the first spoken language to determine a wakeword hypothesis; and
   processing the wakeword hypothesis with a wakeword classifier corresponding to the first spoken language to determine that the audio data includes the second representation of the wakeword.

5. A computer-implemented method comprising:
   receiving audio data representing speech;
   determining, using a first wakeword-detection component, that the audio data includes a first representation of a wakeword;
   determining, using the first wakeword-detection component, language data indicating a first likelihood that the audio data corresponds to a first spoken language;
   determining, using a second wakeword-detection component and the language data, that the audio data includes a second representation of the wakeword; and
   based at least in part on determining that the audio data includes the second representation of the wakeword, sending, to a remote system, data representing the speech.

6. The computer-implemented method of claim 5, wherein determining that the audio data includes the first representation of the wakeword comprises:
   determining audio feature data corresponding to the audio data, the audio feature data representing at least one audio feature of the audio data; and
   processing, using a classifier, the audio feature data to determine a wakeword hypothesis.

7. The computer-implemented method of claim 5, wherein determining the language data comprises:
   determining audio feature data corresponding to the audio data, the audio feature data representing at least one audio feature of the audio data; and
   processing, using a classifier, the audio feature data to determine the language data.

8. The computer-implemented method of claim 5, wherein determining that the audio data includes the second representation of the wakeword comprises:
   determining, using an acoustic model and the audio data, acoustic data corresponding to acoustic units representing the first spoken language;
   processing the acoustic data using a hidden Markov model corresponding to the first spoken language to determine a wakeword hypothesis; and
   processing the wakeword hypothesis with a classifier corresponding to the first spoken language to determine that the audio data includes the second representation of the wakeword.

9. The computer-implemented method of claim 5, further comprising:
   determining, using a voice-activity detection (VAD) component, that the audio data includes a representation of the speech;
   based at least in part on determining that the audio data includes a representation of the speech, activating the first wakeword-detection component; and
   based at least in part on determining that the audio data includes the first representation of the wakeword, activating the second wakeword-detection component.

10. The computer-implemented method of claim 5, further comprising:

receiving, from the remote system, output data corresponding to a command represented in the speech; and causing audio corresponding to the output data to be output.

11. The computer-implemented method of claim 10, further comprising:

sending, to the remote system, the language data, wherein the output data is based at least in part on the language data.

12. The computer-implemented method of claim 5, further comprising:

receiving second audio data;

determining, using the first wakeword-detection component, that the second audio data includes a third representation of the wakeword;

determining, using the first wakeword-detection component, second language data indicating a second likelihood that the second audio data corresponds to a second spoken language;

determining, using an acoustic model and the second audio data, acoustic data corresponding to the second spoken language; and processing the acoustic data using a hidden Markov model corresponding to the second spoken language to determine a wakeword hypothesis.

13. A system comprising:

at least one first processor;

at least one second processor; and at least one memory including instructions that, when executed by the at least one first processor or the at least one second processor, cause the system to:

receive audio data representing speech;

determine, using a first wakeword-detection component, that the audio data includes a first representation of a wakeword;

determine, using the first wakeword-detection component, language data indicating a first likelihood that the audio data corresponds to a first spoken language;

determine, using a second wakeword-detection component and the language data, that the audio data includes a second representation of the wakeword; and based at least in part on determining that the audio data includes the second representation of the wakeword, send, to a remote system, data representing the speech.

14. The system of claim 13, wherein the at least one memory further includes instructions that, when executed by the at least one first processor or the at least one second processor, further cause the system to:

determine audio feature data corresponding to the audio data, the audio feature data representing at least one audio feature of the audio data; and process, using a classifier, the audio feature data to determine a wakeword hypothesis.

15. The system of claim 13, wherein the at least one memory further includes instructions that, when executed by the at least one first processor or the at least one second processor, further cause the system to:

determine audio feature data corresponding to the audio data, the audio feature data representing at least one audio feature of the audio data; and process, using a classifier, the audio feature data to determine the language data.

16. The system of claim 13, wherein the at least one memory further includes instructions that, when executed by the at least one first processor or the at least one second processor, further cause the system to:

determine, using an acoustic model and the audio data, acoustic data corresponding to acoustic units representing the first spoken language;

process the acoustic data using a hidden Markov model corresponding to the first spoken language to determine a wakeword hypothesis; and process the wakeword hypothesis with a classifier corresponding to the first spoken language to determine that the audio data includes the second representation of the wakeword.

17. The system of claim 13, wherein the at least one memory further includes instructions that, when executed by the at least one first processor or the at least one second processor, further cause the system to:

determine, using a voice-activity detection (VAD) component, that the audio data includes a representation of the speech;

based at least in part on determining that the audio data includes a representation of the speech, activate the first wakeword-detection component; and based at least in part on determining that the audio data includes the first representation of the wakeword, activate the second wakeword-detection component.

18. The system of claim 13, wherein the at least one memory further includes instructions that, when executed by the at least one first processor or the at least one second processor, further cause the system to:

receive, from the remote system, output data corresponding to a command represented in the speech; and cause audio corresponding to the output data to be output.

19. The system of claim 18, wherein the at least one memory further includes instructions that, when executed by the at least one first processor or the at least one second processor, further cause the system to:

send, to the remote system, the language data, wherein the output data is based at least in part on the language data.

20. The system of claim 13, wherein the at least one memory further includes instructions that, when executed by the at least one first processor or the at least one second processor, further cause the system to:

receive, from at least one microphone, second audio data;

determine, using the first wakeword-detection component, that the second audio data includes a third representation of the wakeword;

determine, using the first wakeword-detection component, second language data indicating a second likelihood that the second audio data corresponds to a second spoken language;

determine, using an acoustic model and the second audio data, acoustic data corresponding to the second spoken language; and process the acoustic data using a hidden Markov model corresponding to the second spoken language to determine a wakeword hypothesis.

* * * * *